United States Patent [19]

Unuma et al.

[11] Patent Number: 4,789,088

[45] Date of Patent: Dec. 6, 1988

[54] PAPER FEEDING DEVICE

[75] Inventors: Sadao Unuma, Yokonemachi; Masashi Yamashita, Toyoake, both of Japan

[73] Assignee: Tokai Kogyo Kabushiki Kaisha, Japan

[21] Appl. No.: 157,698

[22] Filed: Feb. 19, 1988

[30] Foreign Application Priority Data

Feb. 20, 1987 [JP] Japan ............................ 62-24810[U]

[51] Int. Cl.⁴ ......................... B41J 11/00; G03B 1/22

[52] U.S. Cl. ................................................ 226/74

[58] Field of Search ................................ 226/74, 75; 400/616–616.3

[56] References Cited

U.S. PATENT DOCUMENTS 4,226,353 10/1980 Blaskovic et al. .................... 226/74

FOREIGN PATENT DOCUMENTS 858501 1/1961 United Kingdom .................. 226/74
2184427 6/1987 United Kingdom .................. 226/74

*Primary Examiner*—Stuart S. Levy
*Assistant Examiner*—Lynn M. Sohacki
*Attorney, Agent, or Firm*—Berman, Aisenberg & Platt

[57] ABSTRACT

A paper feeding tractor including a frame formed by a pair of said frames; a driving sprocket rotatably supported between both side frames at a first end portion of the frame; an endless belt adapted to be driven by the driving sprocket; a pair of first supporting rollers located at a second end portion of the frame and arcuate guiding members projecting from the opposite inner surfaces of the side frames at the second end portion for supporting said endless belt in a loop, whereby the endless belt is arcuately supported by the first supporting rollers and the arcuate guiding members; and a second supporting roller rotatably supported between both side frames at a longitudinal position between the driving sprocket and the first supporting rollers to support the inner peripheral surface of the end belt. The arcuate guiding members are designed to support both side edge portions of the inner peripheral surface of the endless belt, while the second supporting roller is designed to support the transversely central portion of the inner peripheral surface of the endless belt.

5 Claims, 4 Drawing Sheets

PAPER FEEDING DEVICE

BACKGROUND OF THE INVENTION

1. Field of the Invention

The present invention relates to a device for supplying a paper to a printer for use with a computer, wordprocessor and plotter, etc. and other various printers.

2. Description of the Prior Art

In a printer for use with a computer, wordprocessor and plotter, etc., there has been widely employed a paper formed with a pair of rows of feed apertures at both side edges thereof for a recording paper for recording characters and figures to be printed by the printer. Each row of the feed apertures is arranged a predetermined distance from each side edge of the paper on a straight line along the side edges of the paper, and the feed apertures are formed at equal intervals.

A device for supplying this kind of paper to the printer is generally provided with a pair of tractors having endless belts at positions corresponding to both sides of the paper along a path of the paper to be supplied to the printer. Each endless belt is provided with a row of plural feed pins projecting outwardly therefrom and arranged at the same intervals as those of the feed apertures of the paper. Each endless belt encompasses a driving sprocket and a driven sprocket or a guide member in a loop. When the driving sprocket is rotated, a plurality of the feed pins present at a straight portion of the endless belt between the driving sprocket and the driven sprocket or the guide member are brought into engagement with the feed apertures of the paper to thereby feed the paper along a straight feed path to the printer.

FIGS. 8 and 9 show a typical example of such a tractor of a paper feeding device as mentioned above. FIG. 8 is a sectional view of the paper feeding device arranged at one side edge of the paper, and FIG. 9 is a transverse sectional view taken along the line IX—IX in FIG. 8. A frame of the paper feeding device is constructed by fixing a first side frame 11 to a second side frame 12 by a suitable means. A driving sprocket 15 is supported to a shaft which is rotatably mounted on and supported between both frames 11 and 12. The first side frame 11 is integrally formed with a belt guiding member 47, and a free end of the belt guiding member 47 abuts against the second side frame 12. The belt guiding member 47 has a U-shape composed of straight portions formed by parallel straight surface portions 49 and 50 and an arcuate portion formed by an arcuate surface portion 48 having an outer peripheral surface smoothly connected to the outer peripheral surfaces of the straight surface portions 49 and 50 and having a radius substantially equal to that of the outer circumferential surface of the driving sprocket 15. The belt guiding member 47 is located in such a manner that an extension line from the outer peripheral surface of the straight surface portions 49 and 50 are in tangential contact with the outer circumferential surface of the driving sprocket 15. Thus, the endless belt 1 is stretchedly mounted on the outer circumferential surface of the driving sprocket 15, the straight surface portions 49 and 50 and the arcuate surface portion 48 of the belt guiding member 47 in a loop. When the driving sprocket 15 is rotated in a direction shown by an arrow in FIG. 8, internal teeth formed on the inner peripheral surface of the endless belt 1 are brought into mesh with external teeth formed on the outer circumferential surface of the driving sprocket 15 to thereby move the endless belt 1. Accordingly, a portion of the endless belt 1 located along the outer circumference of the driving sprocket 15 is driven to run counterclockwise along an arcuated feed path 2. Then, the endless belt 1 is guided by the belt guiding member 47. That is a portion of the endless belt 1 located along a straight surface portion 50 of the belt guiding member 47 is guided to run straight along the straight feed path 5, and a portion of the belt located along the arcuate surface portion 48 of the belt guiding member 47 is guided to run arcuately along the arcuate feed path 3. Then, a portion of the endless belt 1 located along a straight surface portion 49 is guided to run straight along the straight feed path 4. The feed pins 6 are projected from the outer peripheral surface of the endless belt 1 in perpendicular relationship thereto, and are arranged at the same intervals as those of the feed apertures formed at the side edge portion of the paper. During the operation, the feed pins 6 provided at the portion of the endless belt 1 located on the straight surface portion 49 and moving along the straight feed path 4 are brought into engagement with the feed apertures of the paper to thereby feed the paper in parallel relationship to the straight surface portion 49.

In this kind of paper feeding device, the widths of the arcuate surface portion 48 and the straight surface portions 49 and 50 of the belt guiding member 47 are substantially equal to the width of the endless belt 1 as shown in FIG. 9. Accordingly, during the running of the endless belt 1, both side edges of the endless belt 1 are slidingly contacted with opposite inner side surfaces of the first and second frames 11 and 12. With this arrangement, the portion of the endless belt 1 running along the straight feed path 4 is prevented from being laterally slipped. Accordingly, the engagement of the feed pins 6 at the portion of the endless belt 1 running along the straight feed path 4 with the feed apertures of the paper may be stabilized to ensure the feeding of the paper.

However, as the inner peripheral surfaces of the portions of the endless belt 1 running along the arcuate feed path 3, the straight feed paths 4 and 5 are slidingly contacted with the arcuate surface portion 48 and the straight surface portions 49 and 50 of the belt guiding member 47 over the entire width thereof, there occurs a sliding friction due to the sliding contact between the endless belt 1 and the belt guiding member 47. The more the endless belt 1 is stretched longitudinally so as to prevent a slack of the endless belt 1, the greater a surface pressure between the inner peripheral surface of the endless belt 1 and the arcuate surface portion 48 of the belt guiding member 47, thus causing an increase in sliding friction. To cope with this problem, it is necessary to increase a driving force of a driving motor for driving the driving sprocket 15 by an amount corresponding to an increase in the sliding friction. Accordingly, the installation cost and the running cost are increased with an increase in the driving force of the driving motor.

SUMMARY OF THE INVENTION

It is an object of the present invention to provide a paper feeding device which reduces the sliding friction generated between the endless belt and the frame of the paper feeding device as greatly as possible.

To achieve this object, the present invention has the following construction. That is, the frame of the tractor of the paper feeding device is constituted of a pair of side frames. A driving sprocket is supported to a shaft which is mounted on and supported between both side frames at a first end portion thereof. A pair of first supporting rollers are rotatably supported to respective shafts between both side frames at a second end portion thereof at positions aparting a predetermined distance in a direction perpendicular to a line connecting the second end portion with the first end portion. A pair of arcuate rib-like guiding members are formed to project from the opposite inner side surfaces of both side frames at an opposite position of the driving sprocket with respect to the first supporting rollers. An endless belt encompasses the outer peripheral surfaces of the driving sprocket, the first supporting rollers and the arcuate guiding members in a loop. A second supporting roller is rotatably mounted on a shaft provided between both side frames at a position between the driving sprocket and the first supporting rollers and rotatably supported on an axis, so as to support the inner peripheral surface of the endless belt by the outer circumferential surface of the second supporting roller. The arcuate rib-like guiding members projecting from the inner side surfaces of both side frames have a projection height from the inner side surfaces of the side frames smaller than width between the side edge of the endless belt and the peripheral surface of the feed pin, so as to support both side edges of the endless belt. Further, width of the outer circumferential surface of the second supporting roller is substantially equal to the diameter of the feed pin of the endless belt. Further, widths of the driving sprocket and the first supporting rollers are substantially equal to the width of the endless belt.

According to the present invention, since the endless belt is guided by the driving sprocket and the pair of first supporting rollers having a width equal to that of the endless belt when the driving sprocket is driven by the driving motor, the endless belt is stably moved. Further, the friction generated between the first supporting rollers and the endless belt and between the second supporting roller and the endless belt is a rolling friction. Although there is generated a sliding friction only between the endless belt and the arcuate guiding members, the arcuate guiding members are designed to contact the inner peripheral surface at only both side edge portions of the endless belt, and accordingly the sliding friction causing a running resistance of the endless belt may be remarkably reduced.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE PREFERRED EMBODIMENTS

Figure 1:
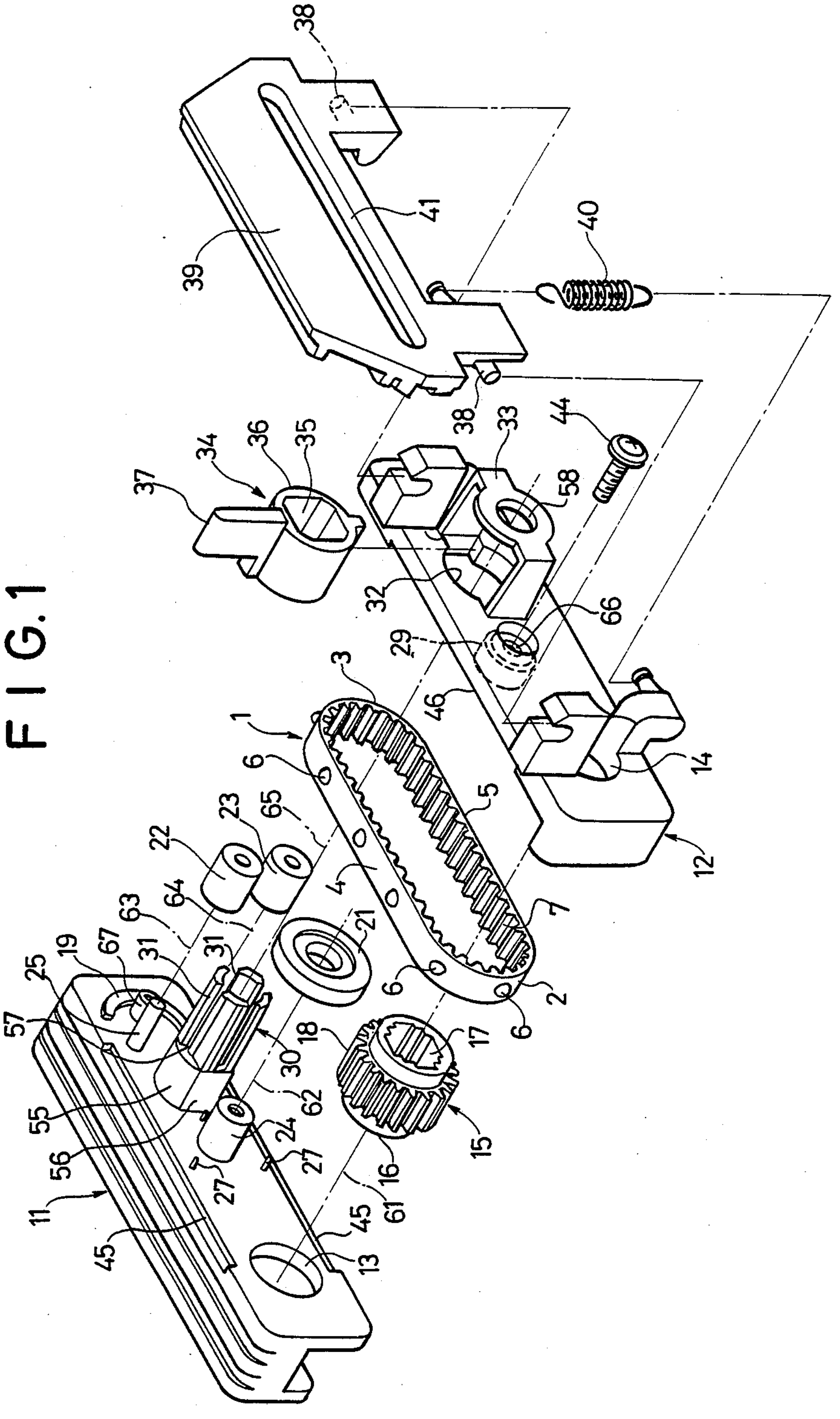
FIG. 1 is an exploded perspective view of a preferred embodiment of the paper feeding device according to the present invention.
Figure 2:
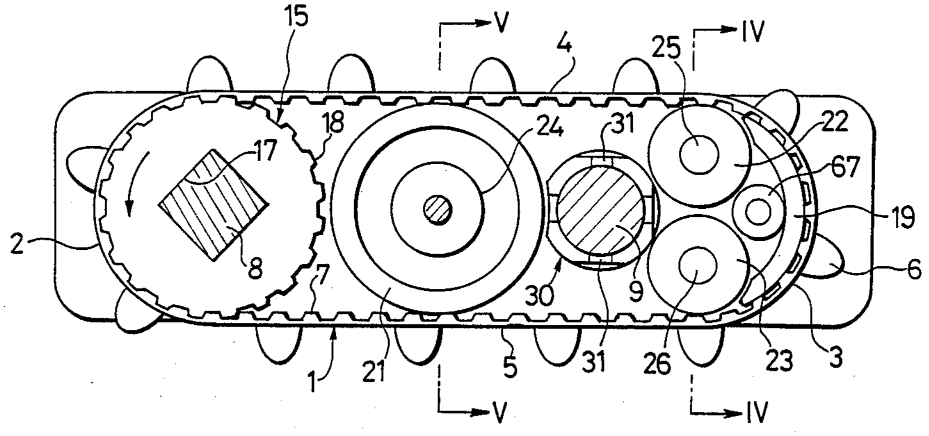
FIG. 2 is a side view of the paper feeding device shown in FIG. 1 with one of the side frames removed.
Figure 3:
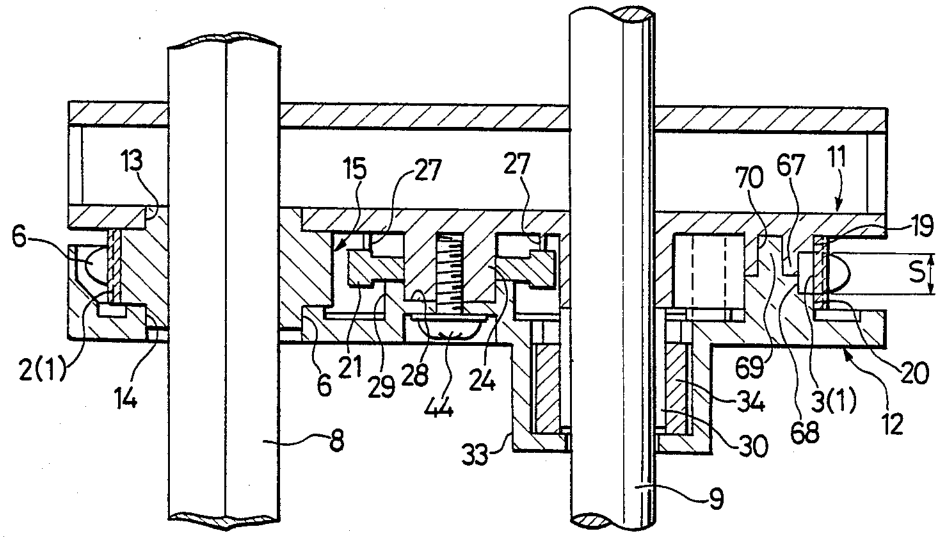
FIG. 3 is a sectional view taken along a plane perpendicular to that of FIG. 2.
Figure 4:
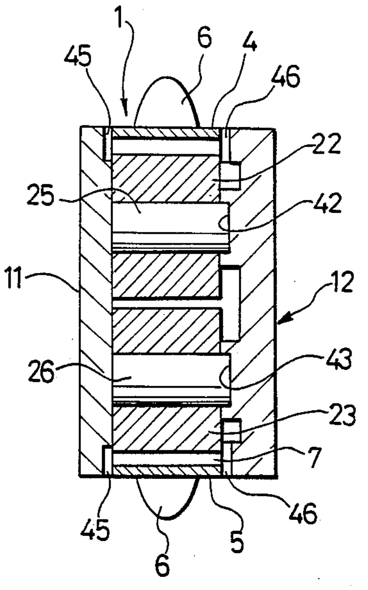
FIG. 4 is a cross section taken along the line IV—IV in FIG. 2.
Figure 5:
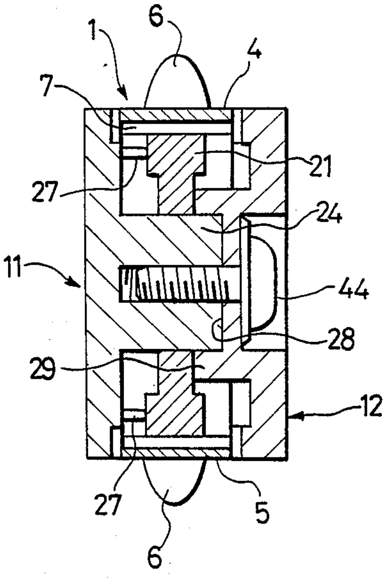
FIG. 5 is a cross section taken along the line V—V in FIG.2.

The drawings show a preferred embodiment of the paper feeding device (tractor) located at a position corresponding to one of the side edges of a paper formed with a pair of rows of feed apertures at both side edges thereof. FIG. 1 is an exploded perspective view of the paper feeding device, in which a first side frame 11 is shown at a left upper position in the figure, and a second side frame 12 is shown at a right lower position in the figure, and the other parts to be assembled with the side frames 11 and 12 are also shown. FIG. 2 is a side view of the paper feeding device shown in FIG. 1 with the second side frame removed. FIG. 3 is a sectional view taken along a plane including an axis of rotation of a driving shaft 8 and an axis of a supporting shaft 9.

A frame of the paper feeding device in the preferred embodiment is constituted of a first side frame 11 located on the center side of the paper with respect to the side edge of the paper and a second side frame 12 located outside of the side edge of the paper. Both side frames 11 and 12 are fixed to each other by a screw 44 to be hereinafter described. Both side frames 11 and 12 have rectangular side surfaces. The side surfaces of the side frames 11 and 12 are formed at a position near each longitudinal one end (first end) with bearing through-holes 13 and 14 having the same axis 61, respectively, and boss portions 16 formed at axially opposite ends of the driving sprocket 15 are rotatably engaged with the bearing through-holes 13 and 14. The first side frame 11 is integrally formed at its longitudinally central portion with a cylindrical supporting pin 24 projecting toward the second side frame 12, and the second side frame 12 is integrally formed with a cylindrical supporting portion 29 projecting coaxially with the supporting pin 24 as having the same axis 62. The cylindrical supporting portion 29 has a diameter larger than that of the supporting pin 24, and is formed at its free end with a cylindrical recess 28 for closely engaging the inside end of the supporting pin 24. Thus, the inside end of the supporting pin 24 is engaged in the recess 28 by a predetermined axial length. The first side frame 11 is also formed at a position near its longitudinal other end (second end) with a pair of cylindrical supporting pins 25 and 26 projecting toward the second side frame 12. The supporting pins 25 and 26 are arranged in spaced relationship from each other in a direction perpendicular to the longitudinal direction of the first side frame 11, and the second side frame 12 is formed with recesses 42 and 43 for receiving the respective inside ends of the supporting pins 25 and 26 in such a manner as to have the same axes 63 and 64 of the supporting pins 25 and 26, respectively. There is further formed at a longitudinally intermediate position between the supporting pin 24 and the supporting pins 25 and 26 of the first side frame 11 a clamping sleeve 30 having a cylindrical base portion 55 as projecting toward the second side frame 12, and there is formed at opposite position of the second side frame 12 a throughhole 32 for receiving the clamping sleeve 30 which through-hole 32 has the same axis 65 of the clamping sleeve 30. As apparent from FIG. 1, the cylindrical base portion 55 is formed with opposite side flat surfaces 56, and the clamping sleeve 30 has a substantially square external shape in section as taken along a plane perpendicular to the axis 65 of the clamping sleeve 30 which square section has a side of the flat surface 56. The clamping sleeve 30 is further formed at its four side surfaces with four slits 31 extending in parallel relationship to the axis 65 to thereby form an assembly of four resilient cantilever beams. Reference numeral 57 designates a stepped portion formed between the cylindrical base portion 55 and the assembly of the four resilient cantilever beams.

First supporting rollers 22 and 23 having a small diameter are rotatably supported on the supporting pins 25 and 26 projecting from the first side frame 11, and a second supporting roller 21 having a large diameter is rotatably supported on the supporting pin 24. Then, supporting pins 24, 25 and 26 are engaged with the recesses 28, 42 and 43 of the second side frame 12, respectively. The clamping sleeve 30 is inserted through the through-hole 32 of the second side frame 12, and is projected therefrom. Further, the driving sprocket 15 is rotatably supported at its boss portion 16 to the bearing holes 13 and 14. The bottom of the recess 28 of the second side frame 12 is formed a through hole 66 having the axis 65 for receiving a screw 44. The screw 44 is inserted through the hole 66, and is threadedly engaged into the inside end of the supporting pin 24, thus fixing the first and second side frames 11 and 12 to each other. Under the circumstance, since the supporting pins 24, 25 and 26 of the first side frame 11 are engaged with the recesses 28, 42 and 43 of the second side frame 12, the relative position between the first and second side frames 11 and 12 is fixed vertically and horizontally. Further, since the inside ends of the supporting pins 24, 25 and 26 abut against the bottoms of the recesses 28, 42 and 43, and the stepped portion 57 formed at the inside end of the cylindrical base portion 55 of the clamping sleeve 30 abuts against the inside surface of the second side frame 12, the space between opposed inner surfaces of the first and second side frames 11 and 12 is set to a predetermined space equal to the width of the endless belt 1, and the space is fixed by the tightening force of the screw 44. Under the fixed condition of the first and second side frames 11 and 12, the boss portions 16 of the driving sprocket 15 are rotatably supported at their outer circumferential surfaces to the first and second side frames 11 and 12, and opposite end surfaces of a sprocket portion formed with teeth 18 extending in parallel to the axis 61 are slightly spaced from the inside surfaces of the first and second side frames 11 and 12.

The first and second side frames 11 and 12 are integrally formed at a position between the supporting pins 25 and 26 and the second end with arcuate rib-like guiding members 19 and 20 projecting from the inside surfaces of both side frames 11 and 12, respectively. The arcuate guiding members 19 and 20 have an arcuate outer surface such that extension lines from the arcuate outer surface is in a tangential contact with the outer circumferences of the first supporting rollers 22 and 23 rotatably supported on the supporting pins 25 and 26. The driving sprocket 15 is formed with an angular hole 17 having a square section with its center defined as the axis 61, and a driving shaft 8 having a square section connected to a driving motor of a driving control device in a printer (not shown) is engaged with the angular hole 17 of the driving sprocket 15. Then, the endless belt 1 stretchedly encompasses the driving sprocket 15, the first supporting rollers 22 and 23, and the arcuate guiding members 19 and 20, and the teeth 7 formed on the inner peripheral surface of the endless belt 1 are brought into mesh with the teeth 18 formed on the outer peripheral surface of the driving sprocket 15. Under the circumstance, when the driving shaft 8 is driven by the driving motor, the portion of the endless belt 1 meshing with the driving sprocket 15 is allowed to arcuately run along the outer periphery of the driving sprocket 15 along the arcuate feed path 3, and the portion of the endless belt 1 guided by the supporting roller 23, the arcuate outer peripheral surfaces of the arcuate guiding members 19 and 20 and the supporting roller 22 is allowed to arcuately run along the arcuate feed path 3. Further, the portions of the endless belt 1 locating from the driving sprocket 15 to the supporting roller 23 and from the supporting roller 22 to the driving sprocket 15 are allowed to run straight along the straight feed paths 4 and 5, respectively. The widths (the axial lengths) of the first supporting rollers 22 and 23 are substantially equal to the width of the endless belt 1 so that the entire width of the endless belt 1 may be supported by the first supporting rollers 22 and 23. Further, the projection heights of the arcuate guiding members 19 and 20 from the inner surfaces of the first and second side frames 11 and 12, respectively, are smaller than the distance from the side edge of the endless belt 1 to the peripheral surface of the feed pin 6, so that the guiding members 19 and 20 may be opposed to each other with a space S (See FIG. 3) substantially equal to the diameter of the feed pin 6 defined between the opposite inside ends of the guiding members 19 and 20. Accordingly, the arcuate guiding members 19 and 20 are allowed to contact and support only the side edge portions of the inner peripheral surface of the endless belt 1 along the direction of width thereof. Further, the second supporting roller 21 is located at the substantially longitudinally central position of the straight feed paths 4 and 5 of the endless belt 1 to contact and support at its outer circumferential surface with the inner surface of the endless belt 1. The outer circumferential surface of the second supporting roller 21 has a width contacting and supporting the central portion of the endless belt 1 along the direction of width thereof where the pin 6 are formed, for example, the width equal to the space S as mentioned above. Thus, since the second supporting roller 21 having a large diameter is allowed to contact only the transversely central portion of the endless belt 1. A desired number of supporting projections 27 (e.g., three projections as shown in FIG. 1) are formed to project from the inner surface of the first side frame 11 and abut against one of the side surfaces of the supporting roller 21, while the free end of the cylindrical supporting portion 29 projecting from the inner surface of the second side frame 12 abuts against the other side surface of the supporting roller 21, thereby hindering the axial movement of the supporting roller 21 and maintaining the axial position thereof. Reference numeral 67 shown in FIGS. 1 and 2 designates a cylindrical positioning member projecting from the inner surface of the first side frame 11 in the vicinity of the arcuate guiding member 19. Similarly, a cylindrical positioning member 68 is formed to project from the inner surface of the second side frame 12 in the vicinity of the arcuate guiding member 20 in opposed relationship to the positioning member 67 of the first side frame 11. The positioning member 68 is formed at its free end with a projection 69 to be engaged with a recess 70 formed at the inside end of the positioning pin 67, so that the space S between the arcuate guiding members 19 and 20 may be ensured.

Figure 6:
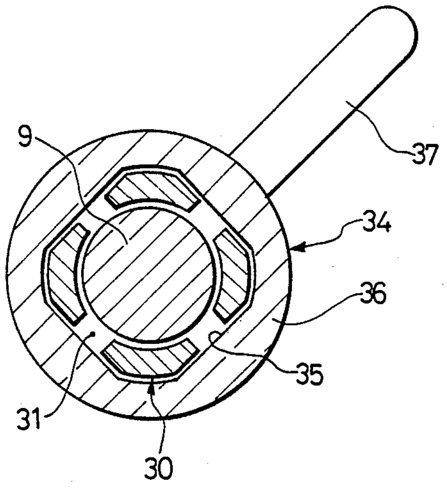
FIG. 6 is a sectional view showing an unlocked condition of a lock lever.
Figure 7:
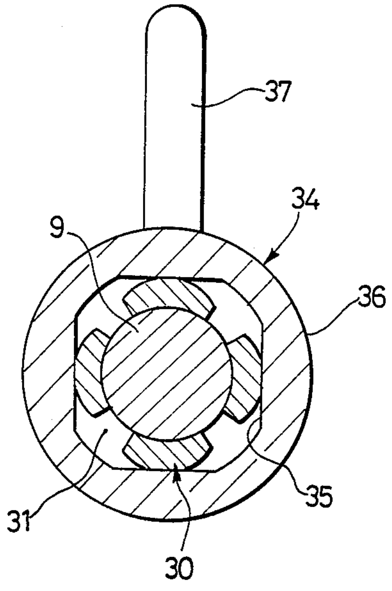
FIG. 7 is a sectional view showing a locked condition of the lock lever.
Figure 8:
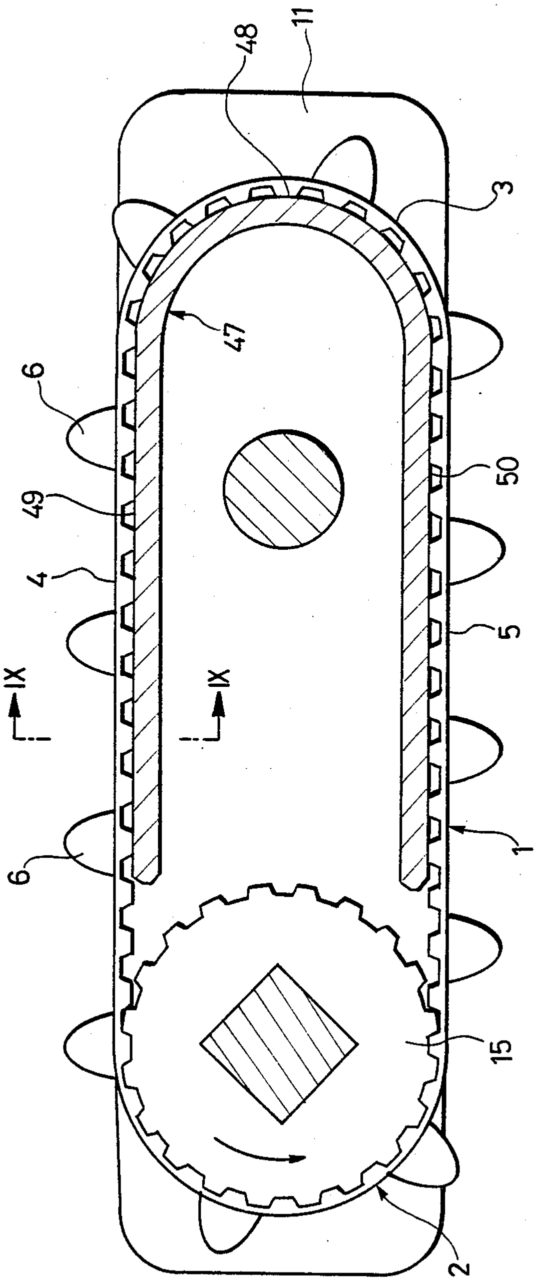
FIG.8 PRIOR ART
FIG. 8 is a sectional view of a typical example of the conventional paper feeding device.
Figure 9:
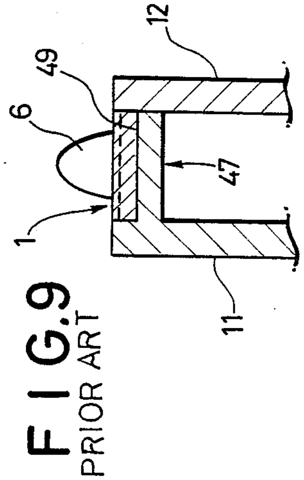
FIG.9 PRIOR ART
FIG. 9 is a cross section taken along the line IX—IX in FIG. 8.

The outer surface of the second side frame 12 is integrally formed with a lever retainer 33 having a hole 58 concentrically with the axis 65. Thus, the supporting shaft 9 fixed to the driving control device of the printer (not shown) is inserted through the holes 58 and 32 of the second side frame 12 and the clamping sleeve 30 of the first side frame 11. A lock lever 34 is engaged with the outer periphery of the clamping sleeve 30 positioned between the holes 32 and 58. The lock lever 34 is integrally formed with a boss 36 having a central angular hole 35 of a square shape in section and with an operating handle 37 projecting outwardly from the outer peripheral surface of the boss 36. The square shape of the angular hole 35 allows to receive the assembly of the four resilient cantilever beams of the clamping sleeve 30 under the free condition or an unlocked condition of the lock lever 34. Under the unlocked condition (See FIG. 6) where the cantilever beams of the assembly of the clamping sleeve 30 are positioned at four corners of the square hole 35, the inner peripheral surface of each cantilever beam is separated from the supporting shaft 9 to make the frame of the paper feeding device releaseable from the supporting shaft 9. When the operating handle 37 is rotated at 45 degrees about the axis 65 of the boss 36 from the above-mentioned position, the outer peripheral surface of each cantilever beam of the clamping sleeve 30 comes into contact with each side of the square hole 35 of the boss 36, and accordingly the inner peripheral surface of each cantilever beam comes into resilient contact with the supporting shaft 9, thus obtaining a locked condition of the lock lever 34 (See FIG. 7). Under the locked condition, the frame of the paper feeding device is fixed through the supporting shaft 9 to the driving control device of the printer.

Referring to FIG. 1, a paper presser plate 39 is pivotally and removably supported by a pair of hinge pins 38 to the upper end portion of the second side frame 12. A spring 40 is provided between the second side frame 12 and the paper presser plate 39 at an offset position from one of the hinge pins 38. The spring 40 serves to bias the paper presser plate 39 so that the latter may be so positioned as to lie over both the upper ends of the first and second side frames 11 and 12. The paper presser plate 39 is formed with an elongated hole 41 along the running direction of the endless belt 1 for permitting the free running of the feed pins 6 projecting from the outer surface of the endless belt 1. Thus, the paper to be fed by the feed pins 6 is prevented from floating from the endless belt 1 owing to the resilient force of the spring 40.

The inner side surfaces of the first and second side frames 11 and 12 are formed at their upper edges with cutouts 45 and 46 opposed to both side edges of the endless belt 1 in order to prevent both side edges of the endless belt 1 to directly contact with the inner side surfaces of the side frames 11 and 12 under the condition where both side frames 11 and 12 are tightly fixed to each other by the screw 44.

The paper feeding device of the present invention is suitably formed of a synthetic resin except the screw 44 and the spring 40, and the side frames 11 and 12 are constructed by integral forming, respectively.

In the device of the preferred embodiment as described above, a pair of the device (tractor) are adjusted in a position corresponding to both side edges of the paper to be fed, and are fixed by the lock levers 34 to the supporting shaft 9 of the driving control device for the printer or the computer, etc., respectively. A pair of the driving sprockets 15 are mounted on the same driving shaft 8, and are driven by the driving motor of the driving control device. Naturally, the pair of the devices (tractor) are located in transversely symmetrical relationship with each other as well known. The paper presser plate 39 of each device is opened against the biasing force of the spring 40, and the feed apertures of the paper are engaged with the feed pins 6 of the portion of the endless belt 1 located at the straight feed path 4 thereof. Then, the paper presser plate 39 is closed by the biasing force of the spring 40, thus setting the paper.

When the driving sprockets 15 are rotated by the driving shaft 8 synchronously therewith in a predetermined direction, the endless belts 1 operate to feed the paper in a predetermined direction. In the arcuate feed path 2 where the teeth 7 formed on the inner peripheral surface of the endless belt 1 are meshed with the teeth 18 formed on the outer peripheral surface of the driving sprocket 15, the endless belt engages the driving sprocket 15 over the entire width of the endless belt 1, and side edges of the endless belt 1 are guided by the inner side surfaces of the first and second side frames 11 and 12, respectively. In the arcuate feed path 3 where the inner peripheral surface of the endless belt 1 is guided by the first supporting rollers 22 and 23 having smaller diameter and the arcuate guiding members 19 and 20. The entire width of the endless belt 1 contacts the outer peripheral surface of the supporting rollers 22 and 23, however, since the supporting rollers 22 and 23 are rotatably supported to the supporting pins 25 and 26, respectively, the running resistance of the endless belt 1 from the supporting rollers 22 and 23 is made small. Furthermore, since only both side edge portions of the endless belt 1 contact the arcuate guiding members 19 and 20, and the endless belt 1 receives no friction resistance at the central portion corresponding to the space S between the guiding members 19 and 20, the whole friction resistance of the endless belt 1 running along the arcuate feed path 3 is reduced. Furthermore, since the inner peripheral surface of the endless belt 1 running along the straight feed paths 4 and 5 is supported on the outer peripheral surface of the second supporting roller 21 having larger diameter and being rotatably supported to the supporting pin 24, the running resistance of the endless belt 1 is made small. Additionally, since the second supporting roller 21 contacts to support the inner peripheral surface of the endless belt 1 at a central portion in the direction of width where the feed pins 6 are formed, the engagement between the feed pins 6 of the endless belt 1 and the feed apertures of the paper is ensured at the straight feed path 4.

As described above, the friction generated between the first supporting rollers 22 and 23 and the endless belt 1 and between the second supporting roller 21 and the endless belt 1 is a rolling friction, and the sliding friction generated between the arcuate guiding members 19 and 20 and the endless belt 1 is small. Accordingly, the driving motor of the driving control device may be made compact with a small capacity.

What is claimed is:

1. A paper feeding device for supplying to a printer a paper formed at both of its side edges with a pair of rows of feed apertures arranged at equal intervals, comprising:

a frame formed by fixing a pair of side frames to each other, said side frames being arranged in parallel spaced relationship to each other;

a driving sprocket rotatably supported between said side frames at a first end portion of said frame;

a pair of first supporting rollers rotatably supported between said side frames at a second end portion of said frame in positions spaced from each other in a direction perpendicular to a line connecting said first end portion with said second end portion;

a pair of arcuate rib-like guiding members projecting from the opposite inner surfaces of said side frames at said second end portion of said frame in a position opposite to said driving sprocket with respect to said first supporting rollers;

an endless belt encompassing said driving sprocket, said first supporting rollers and said arcuate guiding members, said endless belt being adapted to run along a first arcuate feed path along the outer periphery of said driving sprocket, a second arcuate feed path along the outer periphery of said first supporting rollers and the outer periphery of said arcuate guiding members, and two straight feed paths connecting said first arcuate feed paths with said second arcuate feed path, said endless belt being formed with a plurality of feed pins projecting perpendicularly from the outer peripheral surface thereof and arranged at the same pitch as said feed apertures of said paper;

a second supporting roller rotatably supported between said side frames in a position between said driving sprocket and said first supporting rollers, said second supporting roller having an outer circumferential surface for supporting the inner peripheral surface of said endless belt running along said two straight feed paths; and a driving means for driving said driving sprocket, wherein the outer peripheral surfaces of said driving sprocket and said first supporting rollers have a width substantially equal to that of said endless belt, and said arcuate guiding members have a projection height from the inner surfaces of said side frames smaller than a width from the side edge of said endless belt to the peripheral surface of said feed pin, and the outer peripheral surface of said second supporting roller has a width substantially equal to a diameter of said feed pin of said endless belt.

2. The paper feeding device as defined in claim 1, wherein the outer peripheral surface of said driving sprocket is formed with teeth extending in parallel to an axis of said driving sprocket, and the inner peripheral surface of said endless belt is formed with teeth meshing with said teeth of said driving sprocket.

3. The paper feeding device as defined in claim 1, wherein the outer peripheral surface of said arcuate guiding members is arcuate in such a manner that extension lines from both ends of the outer peripheral surface are in tangential contact with the outer peripheral surfaces of said first supporting rollers.

4. The paper feeding device as defined in claim 1, further comprising a supporting means projecting from the inner surfaces of said side frames for rotatably supporting said second supporting roller at a predetermined position between said side frames.

5. The paper feeding device as defined in claim 1, further comprising a cutout formed on at least one of said side frames at a portion of a side edge thereof which is facing the side edge of said endless belt running along said straight feed path.

* * * * *